United States Patent

Nara

[11] Patent Number: 5,567,883
[45] Date of Patent: Oct. 22, 1996

[54] BOURDON TUBE PRESSURE GAUGE HAVING A REMOVABLE COVER

[75] Inventor: Yuki Nara, Yawara-mura, Japan

[73] Assignee: SMC Corporation, Tokyo, Japan

[21] Appl. No.: 512,787

[22] Filed: Aug. 10, 1995

[30] Foreign Application Priority Data

Aug. 25, 1994 [JP] Japan .................... 6-224310

[51] Int. Cl.⁶ ........................................ G01L 7/04
[52] U.S. Cl. ................................ 73/741; 73/431
[58] Field of Search ................ 73/732, 741, 273,
73/431; 324/156; 361/600, 659, 664, 667;
52/105; 215/200, 206, 208, 220, 230; 374/208;
116/266, 270, 271, 305

[56] References Cited

U.S. PATENT DOCUMENTS

| 2,402,360 | 6/1946 | Bevins | 73/431 |
|---|---|---|---|
| 2,509,415 | 5/1950 | Bernreuter | 324/156 |
| 3,152,480 | 10/1964 | Hoff, Jr. | 73/431 |
| 3,166,941 | 1/1965 | Waite et al. | 73/431 |
| 3,293,917 | 12/1966 | Vanderheyden | 73/431 |
| 3,322,380 | 5/1967 | Affel et al. | 73/431 |
| 3,850,327 | 11/1974 | Robinson | 215/225 |
| 4,069,935 | 1/1978 | Hampel | 215/203 |
| 4,281,771 | 8/1981 | Siegel | 215/220 |
| 4,430,691 | 2/1984 | Rea | 374/208 X |
| 4,773,271 | 9/1988 | Mutou et al. | 73/741 |

FOREIGN PATENT DOCUMENTS

| 1498246 | 5/1968 | Germany | 73/741 |
|---|---|---|---|
| 843 | of 1913 | United Kingdom | 73/741 |

Primary Examiner—Richard Chilcot
Assistant Examiner—Paul D. Amrozowicz
Attorney, Agent, or Firm—Oblon, Spivak, McClelland, Maier & Neustadt, P.C.

[57] ABSTRACT

In the pressure gauge of the present invention, in order to prevent mounting screws from dropping off when the pressure gauge is not mounted on a fluid pressure equipment, a counterbore 11a for receiving a head 36a of a mounting screw 36 is formed on a front end of a screw insertion hole 11 on a case 2 of the pressure gauge 1, and with the mounting screw 36 passed through the screw insertion hole 11, a front cover 4 for covering the counterbore 11a is removably mounted on the front surface of the case 2.

2 Claims, 4 Drawing Sheets

BOURDON TUBE PRESSURE GAUGE HAVING A REMOVABLE COVER

BACKGROUND OF THE INVENTION

1. Field of the Invention

The present invention relates to a Bourdon tube pressure gauge used by mounting on a fluid pressure equipment or device such as pressure control valve.

2. Description of the Prior Art

As a Bourdon tube pressure gauge of this type, a pressure gauge is known, for example, as disclosed in Japanese Utility Model Publication 5-39471. In this pressure gauge, an internal device comprising a Bourdon tube and a converting mechanism for converting deformation of the Bourdon tube to a movement of a needle is accommodated in a case, and the rear surface of the case is covered with a back cover. A plurality of mounting screws penetrate through the case and the back cover, and the pressure gauge is fixed on a pressure control valve by these mounting screws.

In the pressure gauge as described above, however, the mounting screws are easily separated from the case and the back cover when the pressure gauge is not fixed on the pressure control valve. As a result, the mounting screws are often separated and dropped off and lost during transportation or mounting operation, and this results in inconvenience or trouble in mounting and handling operations.

Also, when the pressure gauge is fixed on the pressure control valve, the force to fasten the mounting screws is directly applied on the case, and the case may be damaged if it is made of a material such as synthetic resin.

SUMMARY OF THE INVENTION

It is a principal object of the present invention to provide a Bourdon tube pressure gauge, in which mounting screws are not dropped off even when the gauge is not mounted on fluid pressure equipment.

It is another object of the present invention to provide a Bourdon tube pressure gauge, in which the case is not damaged by the fastening force when the mounting screws are strongly fastened to fix the pressure gauge on the fluid pressure equipment.

To attain the above objects, the Bourdon tube pressure gauge according to the present invention comprises an internal device for converting deformation of a Bourdon tube deformed by fluid pressure to a movement of an indicating needle and for indicating it on a dial plate, a window hole with its rear surface opened and used for viewing the dial plate, said pressure gauge further comprising a case where said internal device is accommodated, a front cover removably mounted on front surface of the case and having at least a transparent portion to correspond with said window hole, a back cover to cover the rear surface of the case, and at least one mounting screw for fixing said case on fluid pressure equipment, whereby a screw insertion hole for receiving said mounting screw is provided to penetrate said case in a front-back direction, a counterbore to receive a head of the mounting screw is formed on a front end of the screw insertion hole opened on the front surface of the case, and the counterbore is covered by said front cover.

In the pressure gauge of the present invention as described above, the counterbore of the screw insertion hole is covered by the front cover, and even when the pressure gauge is not mounted on the fluid pressure equipment, the mounting screw inserted into the screw insertion hole is not dropped off from the front surface of the case. When the pressure gauge is fixed on the fluid pressure equipment, the front cover is removed, and the mounting screw is fastened on the fluid pressure equipment.

According to a concrete aspect of the present invention, mounting holes in an arcuate shape having a narrower width portion and a wider width portion are provided at a plurality of positions outside the window hole on the front surface of the case, and engaging pieces to be placed and locked in the mounting holes are provided at positions corresponding to these mounting holes on the cover. By engaging these engaging pieces into the mounting holes and by locking them in the narrower width portion, the cover is mounted on the case.

The cover is provided with a transparent indicating unit for indicating the moving direction for removal or insertion. This indicating unit is provided at a position to correspond to the counterbore of the screw insertion hole. With the head of the mounting screw positioned in the counterbore as background, it is possible to clearly read the indication.

In the present invention, except the counterbore at the front end, a metal pipe is engaged in the screw insertion hole of the case. Therefore, even when the mounting screw is fastened too tightly as the pressure gauge is fixed on the fluid pressure equipment, the fastening force is received by the pipe and no damage occurs on the case.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DESCRIPTION OF THE PREFERRED EMBODIMENT

Figure 1:
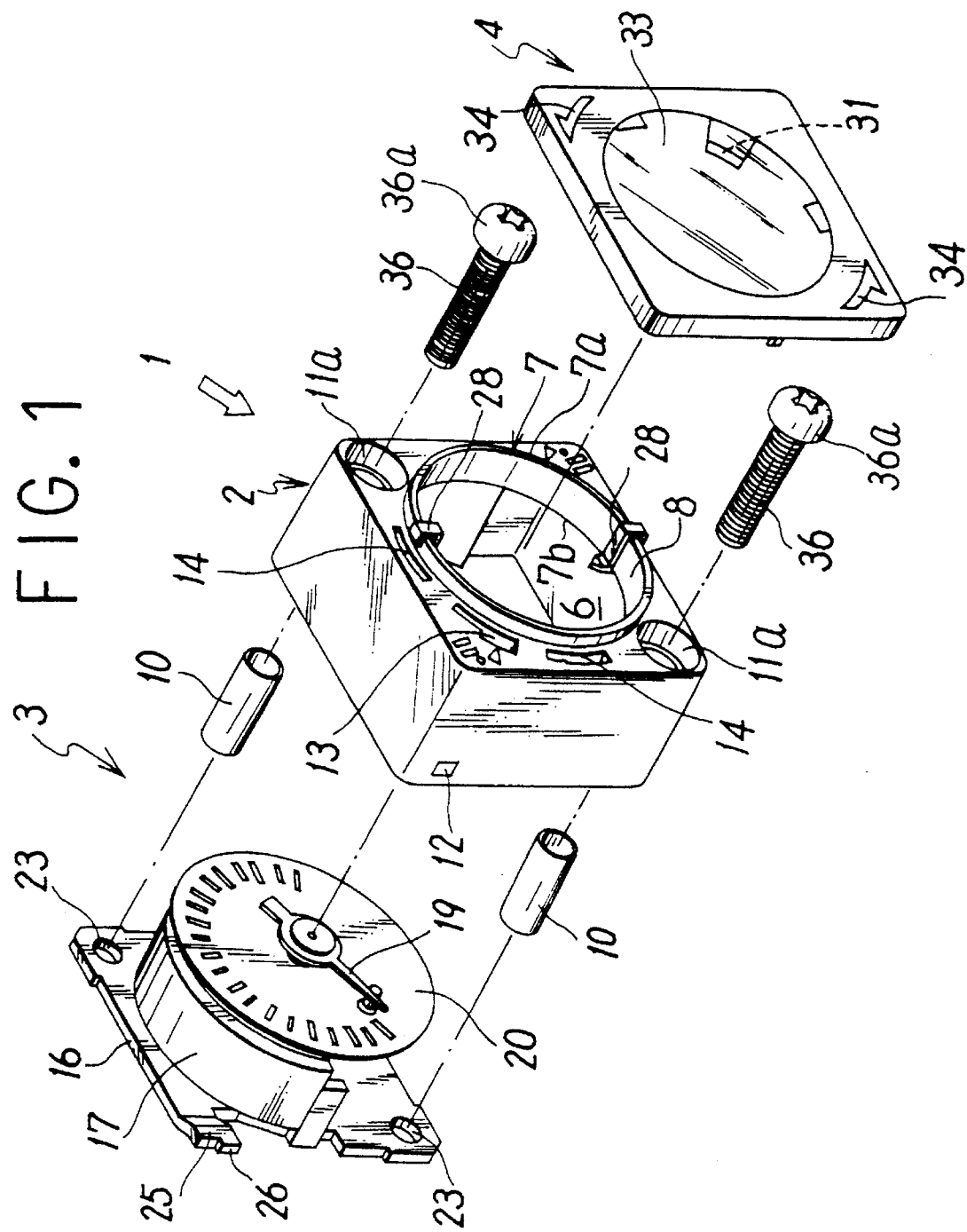
FIG. 1 is an exploded perspective view showing an embodiment of a pressure gauge of the present invention.

FIG. 1 is an exploded perspective view of an embodiment of a Bourdon tube pressure gauge of the present invention. A pressure gauge 1 comprises a case 2, an internal device 3 removably accommodated in the case 2, and a front cover 4 removably mounted and covering the entire front surface of the case 2.

Figure 2:
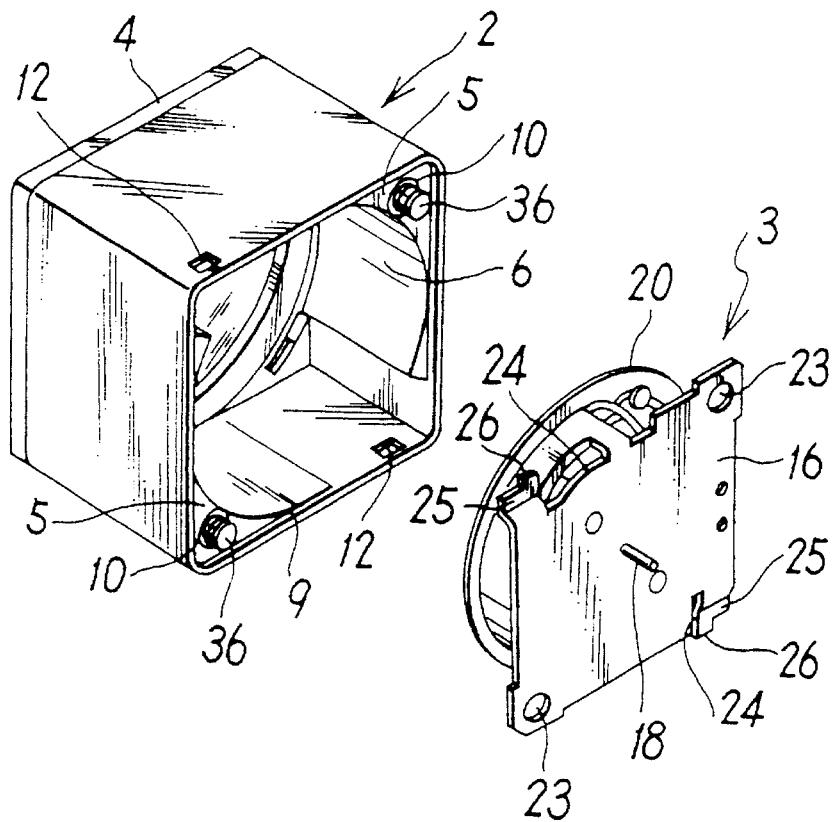
FIG. 2 is an exploded perspective view of an essential part of the embodiment of FIG. 1 when a case and an internal device are seen from the opposite side.

The case 2 is designed with approximately square shape when seen from the front side. As it is evident from FIG. 2, a thick wall portion 5 having its inner surface in an arcuate shape except a pair of diagonal corners is provided in the case, and an accommodating portion 6 designed in an approximately circular shape is formed to accommodate the internal device 3. On the front surface of the case 2, an indicating pin mounting portion 7 is ring-like shaped with smaller diameter than that of the accommodating portion 6 is formed, and the portion surrounded by the indicating pin mounting portion 7 serves as a window hole 8 for viewing a dial plate 20. The entire case 2 is integrally molded and made of synthetic resin.

On the indicating pin mounting portion 7, a plurality (two appearing in the FIG. 1) of pressure range indicating pins 28, 28 for indicating the range of operating air pressure are mounted. The indicating pins 28 are made of a material, which is elastic like synthetic resin or rubber and preferably have a high friction coefficient, and are mounted in such manner that they elastically hold a front edge 7a and a rear edge 7b of the indicating pin mounting portion 7 from both sides and they are freely movable and adjustable to any position.

The rear end of the thick wall portion 5 is positioned somewhat inwardly from the rear end of side wall of the case 2, and between the thick wall portion 5 and the rear end of the side wall of the case 2, a graded step 9 is formed so that a back cover 16 for closing the rear surface of the case 2 can be placed into it.

Figure 6:
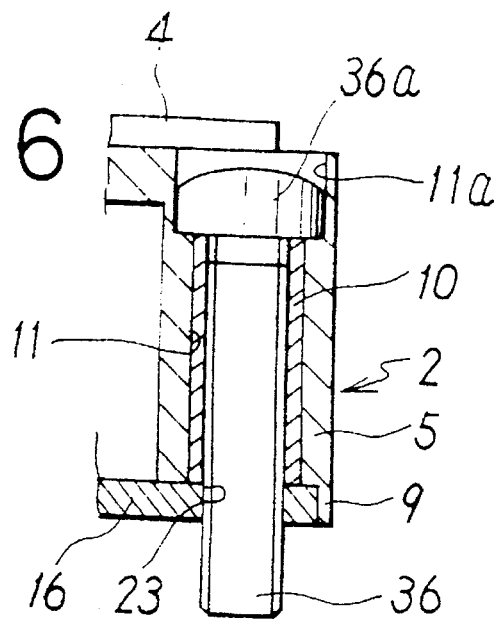
FIG. 6 is an enlarged partial cross-sectional view of a portion of the case where a mounting screw is inserted.

As it is evident from FIG. 6, on said pair of diagonal corners on the case 2, a screw insertion hole 11 is positioned on the thick wall portion 5 respectively. Into each of these screw insertion holes 11, a metal pipe 10 is forcibly inserted. On the front end of each of the screw insertion holes 11, a counterbore 11a to be engaged with a head 36a of a mounting screw 36 is formed. The pipe 10 is not inserted into the counterbore 11a.

Figure 3:
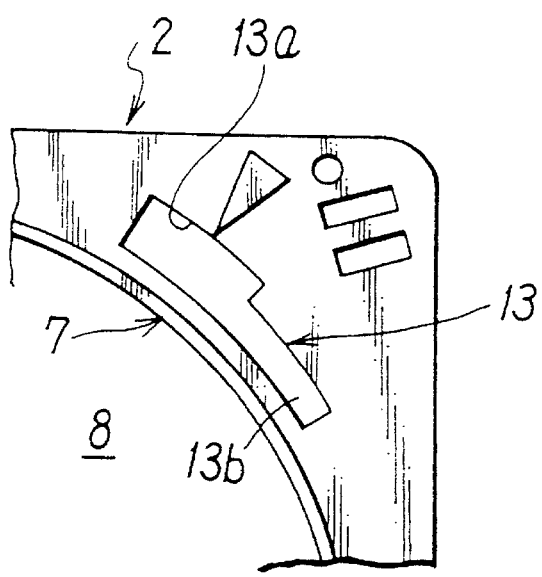
FIG. 3 is an enlarged partial front view of an essential part of the case.

On each of another pair of diagonal corners on the front surface of the case 2, as it is evident from FIG. 3, a mounting hole 13 of an arcuate shape for mounting a front cover 4 is provided respectively at an outer position than the window hole 8, and each of the mounting holes 13 comprises a portion with wider width 13a and a portion with narrower width 13b.

Between the counterbore 11a on the front surface of the case and the mounting hole 13, a plurality of arcuate guide grooves 14 are formed.

The internal device 3 comprises the metal back cover 16 in square shape and for covering the open rear surface of the case 2, a Bourdon tube 17 of an arcuate shape serving as pressure receiving means and having one end thereof fixed on the back cover 16, a conduit tube 18 (see FIG. 2.) for introducing air pressure into the Bourdon tube 17, and a converting mechanism (not shown) for converting deformation of the Bourdon tube 17 to movement of the indicating needle 19 to indicate it on the dial plate 20. One end of the conduit tube 18 is opened into the Bourdon tube 17 and the other end air-tightly penetrates the back cover 16 and is projecting outwardly. Therefore, when the Bourdon tube 17 is deformed by the air pressure, which exerts action via the conduit tube 18, the deformation is converted to the movement of the needle 19, and the air pressure can be read on the scale of the dial plate 20.

Figure 5:
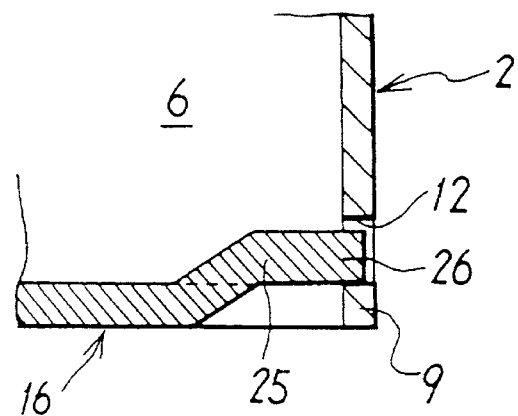
FIG. 5 is an enlarged partial cross-sectional view of a back plate and the case when they are engaged and locked with each other.

On a pair of diagonal corners on the back cover 16, insertion holes 23 for the mounting screws 36 are formed. On each of another pair of diagonal corners, a mounting piece 25 is formed by a notch 24. The forward end of the mounting piece 25 is slightly bent toward the case 2 and an engaging piece 26 is provided at its tip. As shown in FIG. 5, when the engaging piece 26 is locked by engaging it into an engaging hole 12 on the case 2, the internal mechanism 3 is removably mounted on the accommodating portion 6 of the case 2.

Instead of providing the insertion hole 23 on the back cover 16, the portion of the insertion hole 23 on the back cover 16 may be cut off. In such case, the pipe 10 should be made longer by the thickness of the back cover 16 so that the tip of the pipe 10 is brought into direct contact with the fluid pressure equipment.

The front cover 4 is made of transparent plastic and is designed in the same square shape as the front surface of the case, and it also comprises a transparent portion 33 of an circular shape corresponding to the window hole 8 of the case 2 and an indicating unit 34 having an arrow and/or a character indicating the rotating direction for removal or insertion, and the portion except the transparent portion 33 and the indicating unit 34 is colored in the same color as the case 2 or with rough surface so that it looks opaque.

The indicating portion 34 is provided at a position to match the screw insertion hole 11 at each of the pair of diagonal corners. With the head 36a, colored brown or black, of the mounting screw 36 at each of the counterbore 11a as background, the transparent indicating unit 34 can be clearly identified and read.

Figure 4A:
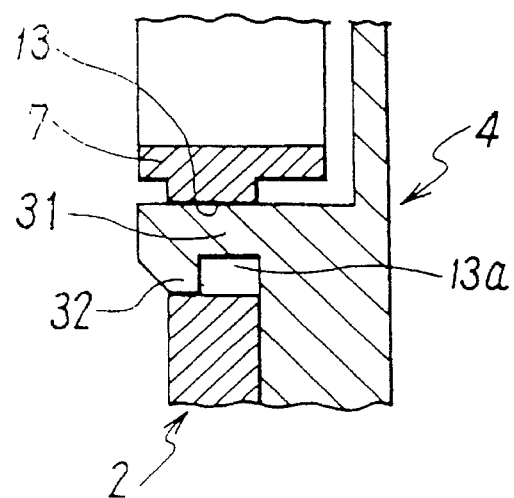
FIGS. 4(A) and (B) each represents an enlarged partial cross-sectional view of the case and the cover when they are mounted together.
Figure 4B:
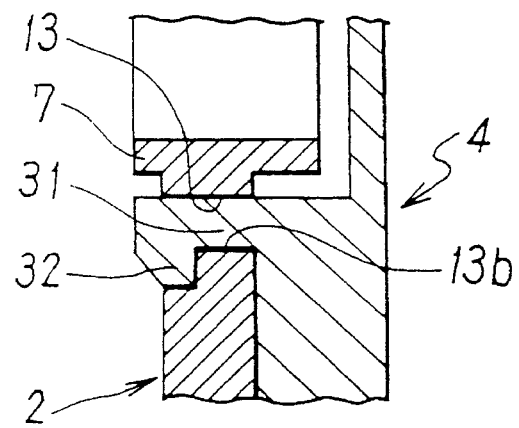

On the rear surface of the front cover 4, a plurality of engaging pieces 31 to be engaged and locked in the mounting holes 13 of the case 2 are provided on the other pair of diagonal corners as shown in FIGS. 4(A) and (B), and a plurality of projections (not shown) to be engaged in the guide grooves 14 are provided. Each of the engaging pieces 31 has a pawl 32. After an engaging sector 31 is engaged into the mounting hole 13 via the wider width portion 13a, the front cover 4 is rotated in a direction toward the narrower width portion 13b along the arc of the mounting hole 13, and the pawl 32 is locked in the edge of the narrower width portion 13b. As a result, the front cover 4 is mounted on the case 2.

In this case, because the front cover 4 and the case 2 are designed in a square shape, when the front cover 4 is inserted or removed, the front cover 4 can be easily and reliably rotated by an angle as desired by applying fingers on either pair of the corners of the front cover 4. Moreover, when the front cover 4 is mounted on the case 2, the front cover 4 is deviated by an angle with respect to the case 2 and the engaging piece 31 is inserted into the mounting hole 13. In this case, the corner of the front cover 4 is laterally deviated from the corner of the case to facilitate the finger application, and the front cover 4 can be easily and reliably rotated in the direction as desired.

In the pressure gauge 1 with the above arrangement, when the internal device 3 mounted on the back cover 16 is inserted into the accommodating portion 6 of the case 2 and the engaging portion 26 of each of the mounting pieces 25 on the back cover 16 is engaged in each of the engaging holes 12 of the case 2, the internal device 3 can be assembled in the case 2.

When the side wall of the accommodating portion 6 is slightly deformed, the engagement of the engaging pieces 26 with the engaging holes 12 is released, and the back cover 16 and the internal device 3 can be removed from the case 2.

Next, after inserting the mounting screw 36 into the pipe 10 on the case 2 via front surface of the case 2, the front cover 4 is mounted on the front surface of the case 2. Thus, the pressure gauge can be assembled.

In this case, the head 36a of the mounting screw 36 is sunken in the counterbore 11a, and the head 36 does not hinder mounting of the front cover 4. After the front cover 4 has been mounted, the front cover 4 covers the counterbore 11a, and this prevents the mounting screw 36 from falling off the case 2. Therefore, during transportation of the pressure gauge 1 or when it is taken out from the box, the mounting screws 36 are not easily removed or lost, and this provides great convenience in handling.

Further, the transparent indicating unit 34 of the front cover 4 is at a position to correspond to the counterbore 11a and the colored head 36a of the mounting screw 36 can be clearly seen and the indicating unit 34 can be easily read.

Figure 7:
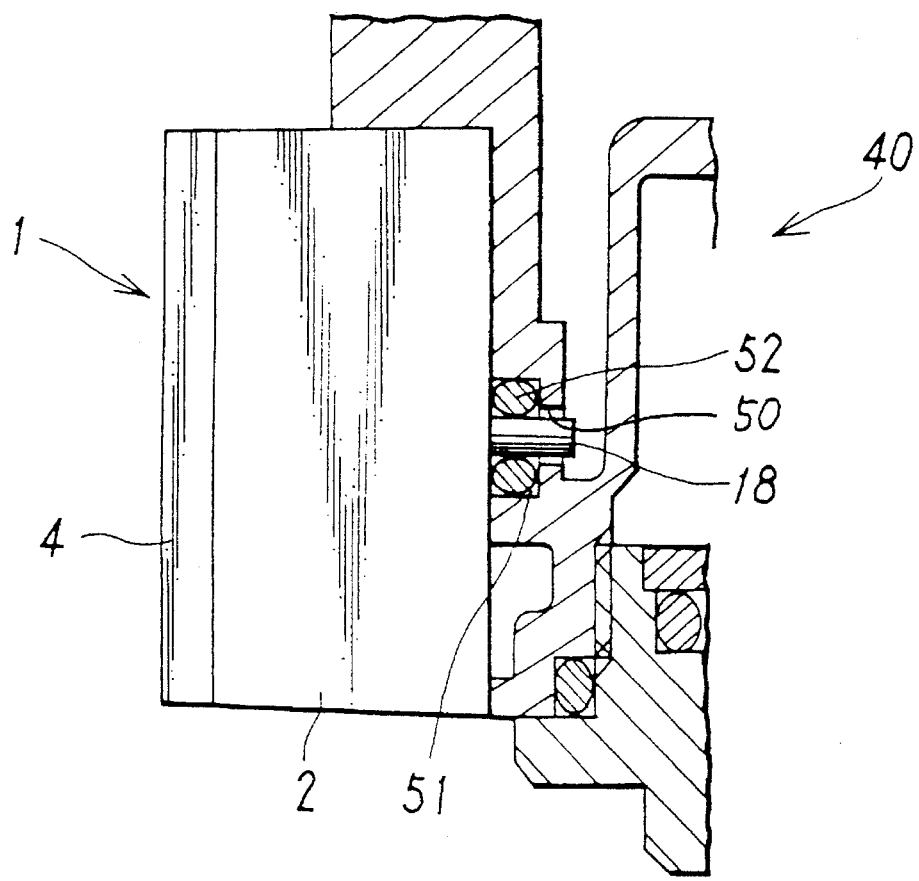
FIG. 7 is an enlarged partial view of an essential part of the pressure gauge of the present invention when it is mounted on a fluid pressure equipment.

The pressure gauge 1 is mounted and used on a fluid pressure equipment or device such as pressure control valve, fluid pressure actuator, etc. FIG. 7 shows a Bourdon tube pressure gauge mounted on a pressure control valve 40, which is an example of the fluid pressure equipment.

The pressure control valve 40 has a mounting port 50 for the pressure gauge communicated with a fluid pressure measuring unit (output port). A recess 51 is formed on an opening of the mounting port 50, and a seal ring (O-ring) 52 is placed in the recess 51.

To mount the pressure gauge 1, the conduit tube 18 projecting from the back cover 16 is passed through the seal ring 52 and is inserted into the mounting port 50 and the front cover 4 is removed from the case 2. After the mounting screw 36 is fastened into the screw hole of the pressure control valve 40, the front cover 4 is mounted again.

In this case, the fastening force of the mounting screw 36 is received by the metal pipe 10, and no large force is applied on the case 2. Accordingly, even when the case 2 is made of synthetic resin with relatively weak strength, there is no danger of damage.

The seal ring 52 is to seal the gap between the conduit tube 18 and the side wall of the recess 51 in radial direction of the seal ring 52, and it is not to seal the gap between the back cover 16 of the case 2 and the depth of the wall of the recess 51 in an axial direction. Therefore, there is no need to fasten the mounting screw 36 with as big a force as required for sealing.

In the Bourdon tube pressure gauge 1 thus mounted, the air in the fluid pressure measuring unit of the pressure control valve 40 flows into the Bourdon tube 17 via the conduit tube 18, and its deformation is converted to the movement of the indicating needle 19 by the converting mechanism, and the movement is displayed on the dial plate 20. As a result, the air pressure on the output port can be measured.

What we claim are:

1. A Bourdon tube pressure gauge, comprising:

an internal device having a dial plate; said internal device converting deformation of a Bourdon tube deformed by fluid pressure into movement of an indicating needle and indicating the deformation on said dial plate, a window hole having a rear surface thereof opened permitting viewing of the dial plate, a case within which said internal device is accommodated, a front cover removably mounted on a front surface of the case and having at least a transparent portion corresponding with said window hole, a back cover covering the rear surface of the case, and at least one mounting screw fixing said case to fluid pressure equipment, wherein a screw insertion hole receiving said mounting screw penetrates said case in a front-to-back direction, a counterbore receiving a head of the mounting screw is formed on a front end of the screw insertion hole, and the counterbore is covered by said front cover;

wherein arcuate shaped mounting holes having a narrower width portion and a wider width portion are provided at a plurality of points outside the window hole on the front surface of the case;

engaging pieces engaging with and being locked in the mounting holes are provided at positions corresponding to said mounting hole on the case wherein, upon engaging said engaging pieces in the mounting holes and locking said engaging pieces at said narrower width portion, the cover is mounted on the case; and said cover is provided with an indicating unit indicating a direction of rotation permitting one of removal of and insertion of said cover on said case, said indicating unit being integrally molded and comprising plastic wherein said front cover includes a transparent portion and said indicating unit includes an opaque portion, said indicating unit being positioned so as to correspond to the counterbore of the screw insertion hole and wherein the head of the mounting screw is positioned in the counterbore so as to form a background for the indicating unit when viewing said indicating unit and assists in reading the indicating unit.

2. A pressure gauge according to claim 1 to 3, which comprises a metal pipe positioned in the screw insertion hole of the case with the exception of a front end portion of the counterbore.

* * * * *